United States Patent
Festag (10) Patent No.: US 8,936,271 B2
(45) Date of Patent: Jan. 20, 2015

(54) AIRBAG MODULE FOR A VEHICLE SEAT ASSEMBLY

(71) Applicant: Lear Corporation, Southfield, MI (US)

(72) Inventor: Peter Festag, Erding (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/030,361

(22) Filed: Sep. 18, 2013

(65) Prior Publication Data

US 2014/0077480 A1    Mar. 20, 2014

(30) Foreign Application Priority Data

Sep. 19, 2012 (DE) .......................... 10 2012 108 818
Aug. 14, 2013 (DE) .......................... 10 2013 216 178

(51) Int. Cl.
   *B60R 21/16* (2006.01)
(52) U.S. Cl.
   USPC ...................................................... 280/730.2
(58) Field of Classification Search
   USPC ...................................................... 280/730.2
   See application file for complete search history.

(56) References Cited

U.S. PATENT DOCUMENTS

| | | | | |
|---|---|---|---|---|
| 5,678,853 A | * | 10/1997 | Maly | 280/730.2 |
| 5,785,350 A | * | 7/1998 | Inoue et al. | 280/743.2 |
| 5,816,610 A | * | 10/1998 | Higashiura et al. | 280/728.3 |
| 5,860,673 A | * | 1/1999 | Hasegawa et al. | 280/730.2 |
| 5,893,579 A | * | 4/1999 | Kimura et al. | 280/730.2 |
| 6,045,151 A | | 4/2000 | Wu | |
| 6,237,934 B1 | | 5/2001 | Harrell et al. | |
| 7,134,685 B2 | * | 11/2006 | Panagos et al. | 280/730.2 |
| 7,134,686 B2 | * | 11/2006 | Tracht et al. | 280/730.2 |
| 7,195,277 B2 | * | 3/2007 | Tracht et al. | 280/730.2 |
| 7,281,735 B2 | | 10/2007 | Acker et al. | |
| 7,290,793 B2 | * | 11/2007 | Tracht | 280/730.2 |
| 7,325,825 B2 | * | 2/2008 | Tracht | 280/730.2 |
| 7,328,912 B2 | * | 2/2008 | Tracht et al. | 280/730.2 |
| 7,357,412 B2 | * | 4/2008 | Tracht et al. | 280/730.2 |
| 7,441,797 B2 | * | 10/2008 | Tracht et al. | 280/730.2 |
| 7,540,529 B2 | * | 6/2009 | Tracht et al. | 280/730.2 |
| 7,556,287 B2 | * | 7/2009 | Inoue et al. | 280/730.2 |
| 7,717,459 B2 | | 5/2010 | Bostrom et al. | |
| 7,819,423 B2 | | 10/2010 | Loibl et al. | |
| 8,123,246 B2 | * | 2/2012 | Gilbert et al. | 280/730.2 |
| 8,474,858 B2 | * | 7/2013 | Urabe et al. | 280/728.2 |
| 8,528,934 B2 | * | 9/2013 | Kobayshi et al. | 280/740 |
| 2006/0113764 A1 | * | 6/2006 | Tracht | 280/730.2 |
| 2007/0138778 A1 | * | 6/2007 | Takemura et al. | 280/743.1 |
| 2009/0315305 A1 | * | 12/2009 | Evans et al. | 280/730.2 |

FOREIGN PATENT DOCUMENTS

| | | |
|---|---|---|
| DE | 102005051043 A1 | 5/2007 |
| DE | 102007031622 A1 | 1/2009 |
| DE | 102011007711 A1 | 9/2011 |
| DE | 102004006320 C5 | 10/2012 |
| DE | 102012009886 A1 | 12/2012 |
| DE | 102012224178 A1 | 3/2013 |

(Continued)

*Primary Examiner* — Faye M. Fleming
(74) *Attorney, Agent, or Firm* — Brooks Kushman P.C.

(57) ABSTRACT

An bag assembly is provided with a flat lateral profile for increased compactness in the lateral direction. A folded airbag is inflated by an inflator to unfold and project in a longitudinal direction. The folded airbag has a central fold extending in the longitudinal direction and a pair of distal folds disposed opposite the inflator and defining a distal end of the central fold.

20 Claims, 6 Drawing Sheets

(56) References Cited

FOREIGN PATENT DOCUMENTS

| WO | 2007134737 | A1 | 11/2007 |
| WO | 2013008999 | A1 | 1/2013 |
| WO | 2013024071 | A1 | 2/2013 |
| WO | 2013034742 | A1 | 3/2013 |

* cited by examiner

AIRBAG MODULE FOR A VEHICLE SEAT ASSEMBLY

CROSS-REFERENCE TO RELATED APPLICATIONS

This application claims priority to German Patent Application No. DE 10 2012 108 818.7 filed Sep. 19, 2012, and German Patent Application No. DE 10 2013 216 178.6 filed Aug. 14, 2013, the disclosures of which are hereby incorporated in their entirety by reference herein.

TECHNICAL FIELD

The present disclosure relates to an inflatable airbag assembly for a vehicle seat assembly.

BACKGROUND

Vehicle seat assemblies may be provided with inflatable airbags. U.S. Pat. Nos. 6,045,151 and 6,237,934 disclose examples of such vehicle seat assemblies.

DETAILED DESCRIPTION

The present disclosure describes various vehicle seat configurations that include an inflatable airbag module. Several specific embodiments are set forth in the following description and in FIGS. 1-15 provide a thorough understanding of certain embodiments according to the present disclosure. As those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without several of the specific features explained in the following description.

Figure 1:
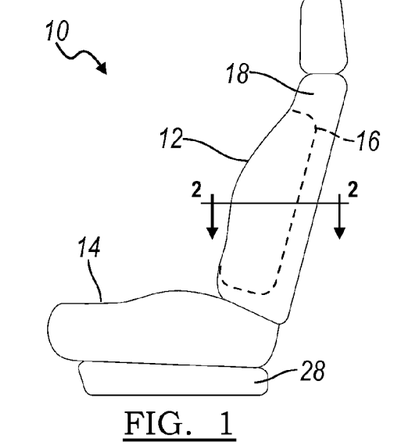
FIG. 1 is a side view of a vehicle seat assembly according to the present disclosure and including an airbag module positioned in a seat back cushion assembly.

FIG. 1 shows a vehicle seat assembly 10 according to the present disclosure for use in a motor vehicle. The seat assembly 10 includes a seat back cushion assembly 12 and a seat bottom cushion assembly 14 attached to the seat back cushion assembly 12. The seat back cushion assembly 12 includes an airbag arrangement or assembly, such as an airbag module 16, a seat pad 18 overlaying the airbag module 16, and a trim cover 20 overlaying the seat pad 18 and airbag module 16.

Figure 2:
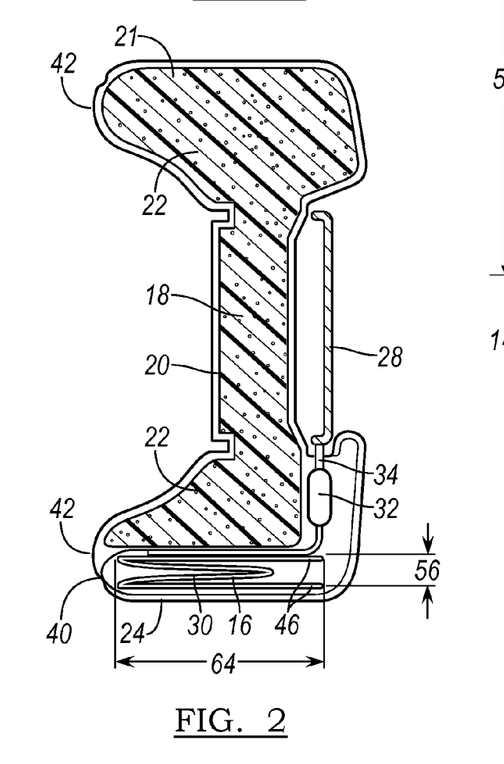
FIG. 2 is a side view of a vehicle seat assembly according to the present disclosure and including an airbag module positioned in a seat back cushion assembly.

Referring to FIG. 2, the airbag module 16 may be disposed proximate one side of the seat back cushion assembly 12 along an inboard lateral side 21, or an outboard lateral side 24. The outboard lateral side 24 may be the side of the seat assembly 10 closest to a door panel of a vehicle. For example, as illustrated in FIG. 2, the airbag module 16 may be disposed proximate a side bolster cushion 22 along the outboard lateral side 24 of the bolster cushion 22.

The airbag module 16 may be connected to a support member, such as a seat back frame 28. Alternatively, the airbag module 16 may be located in any suitable position on the seat back cushion assembly 12 or seat bottom cushion assembly 14. Furthermore, the seat back cushion assembly 12 and seat bottom cushion assembly 14 may each be provided with one or more airbag modules 16, such as outboard and inboard airbag modules 16 that each has a similar configuration and function as described below in detail.

In the embodiment shown in FIG. 2, the airbag module 16 includes an inflatable airbag 30 and an inflator 32 attached to the airbag 30. The inflator 32 is configured to supply inflation fluid, such as gas, to the airbag 30, thereby facilitating deployment of the airbag 30. The inflator 32 may be connected to the frame 28, or other suitable support member, in any suitable manner, such as with one or more fasteners 34. The fasteners 34, which may each include a bolt and nut for example. Alternatively, the airbag module 16 may be connected to the frame 28, or other suitable support member, in any suitable manner.

As shown in FIG. 2, a portion of a seat frame 28 can be used for mounting the seat assembly 10 to a vehicle. The seat pad 18 may be directly attached to the frame 28 at various points. The seat frame 28 can be made of any suitable material, such as metal, plastic, rigid foam, or a composite such as carbon fiber disposed in a resin matrix.

Figure 3:
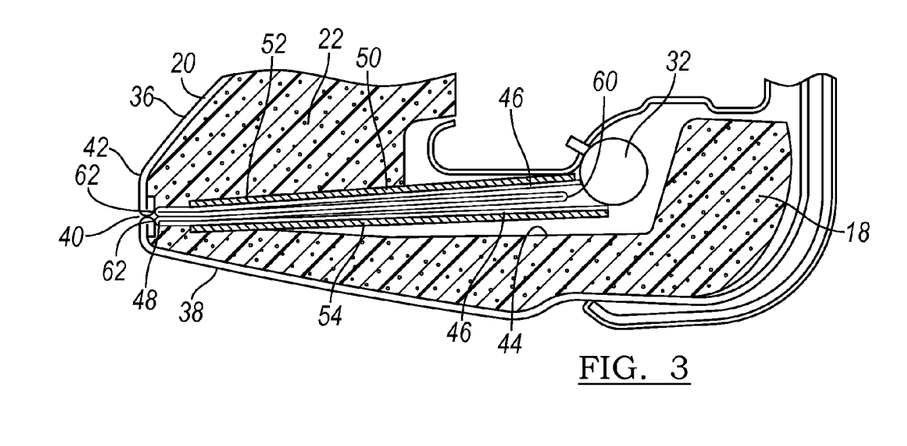
FIG. 3 is a cross-sectional view of a portion of the seat back cushion assembly taken along line 2-2 of FIG. 1 and showing various components of the airbag module, including an inflatable airbag and a housing that receives the airbag.

Turning to FIG. 3, a portion of the section view 2-2 is illustrated showing one side of the seat back assembly 12 and one side bolster cushion 22 with the airbag module 16.

The trim cover 20 may be made of any suitable material, such as cloth, vinyl and/or leather, and may be provided with or without a padding layer and/or backing layer. Furthermore, the trim cover 20 may include multiple pieces that are joined together at seams. In at least the illustrated embodiment, the trim cover 20 includes a first or front panel 36 and a second or side panel 38 that cooperate to form an airbag release seam 40. In at least one embodiment, the release seam 40 is adjacent to a front side 42 of the seat pad 18 that faces a seat occupant when the seat occupant is seated on the seat assembly 10. The bolster cushion 22 also extends forward in a fore-aft direction as well as laterally to an outboard or inboard side of the seat assembly 10 in a vehicle in which the seat assembly 10 is mounted.

It should be understood that the location of the release seam 40 can vary as desired. For example, the panels 36 and 38 may be connected together with sewn stitching to define the deployment seam 40. In another example, ends of the front and side panels 36 and 38, respectively, may not be directly connected together, but merely abut each other to define the seam 40. In at least one embodiment, the release seam 40 extends the entire vertical length of the bolster cushion 22, however, the release seam 40 can be any suitable length.

Figure 4:
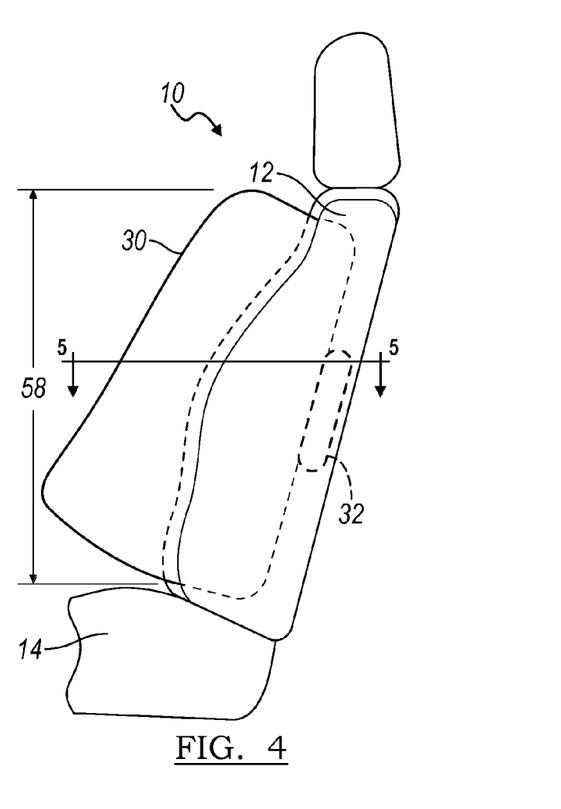
FIG. 4 is a side view of a vehicle seat assembly of FIG. 1 with the airbag module shown in a deployed position.

Referring again to FIG. 3, in the illustrated embodiment, the airbag module 16 is located within the trim cover 20 and is mounted on the frame 28 adjacent the airbag release seam 40 in a spaced relationship from the release seam 40. The schematically illustrated folded airbag 30, upon deployment, is inflated by inflation fluid from the inflator 32 to unfold and project outwardly from the seat 10 through the airbag release seam 40 of the trim cover 20. The inflated airbag 30 is illustrated in FIG. 4.

The folded airbag 30 has a pair of elongated end segments 46. Each of the elongated segments 46 extend from the inflator 32 toward the front side 42. Each of the elongated segments 46 extend from the inflator 32 to a distal folds 62. The at least one distal fold 62 defines a forward edge 48 of the folded airbag 30. The elongated end segments 46 generally define the longitudinal length dimension 64 of the folded air bag 30 in the longitudinal direction.

As shown in FIG. 3, the airbag module 16 can be disposed in a channel 44 or cavity of the seat pad 18 bolster cushion 22. For example, the seat pad 18 may be disposed in front of and along an inboard side and outboard side of the airbag module 16, as shown in FIG. 3. As another example, the seat pad 18 may be disposed in front of and behind the airbag module. As yet another example, the seat pad 18 may be disposed on all sides of the airbag module 16. In at least one embodiment, the seat pad 18 is made from a molded polymeric material, such as a polyurethane foam. Alternatively, the seat pad 18 may comprise any suitable material, and may be made in any suitable manner.

With continuing reference to FIG. 3, an airbag support structure 50 of is illustrated with the airbag module 16. The airbag support structure 50 and the airbag 30 may be secured to each other. The airbag support structure 50 helps in the mounting process of the airbag module 16. In at least one embodiment, the airbag support structure 50 comprises a pair of support panels disposed adjacent the elongated end segments 46 for providing support to the airbag module 16. The support pair panels include an inner panel 52 and an outer panel 54. The inner panel 52 and outer panel 54 are made of pasted plastic or pasted board, such as vinyl or millboard/paper or any suitable sheet material effective to provide some stiffness to the airbag module 16 while allowing some flexibility.

The inner panel 52 and outer panel 54 also protect the bolster cushion 22 during deployment of the airbag 30. The airbag support structure 50 can be helpful in reducing friction on the airbag 30 as the airbag 30 rapidly deploys. In at least one embodiment, the airbag support structure 50 is effective to inhibit contact between the deploying airbag 30 and the bolster cushion 22. This can help to prevent energy loss from the airbag 30 by decreasing friction and protecting the bolster cushion 22 from damage. This, in turn, can also help to reduce the deployment time for the airbag 30 and/or the amount of inflation fluid required to deploy the airbag 30.

The airbag module 16 has a very flat profile 56 in a lateral direction for use with a seat assembly having a small backrest frame. The flat profile airbag module 16 may also be used in backrests having narrow bolster portions, or any seat configuration requiring an airbag with flat packaging constraints. The airbag profile 56 can also include the inner panel 52 and outer panel 54.

Even though the airbag module 16 has a flat profile 56 in the lateral direction, the airbag module 16 can extend substantially along the upright dimension 58 of the seatback 12. In at least one embodiment, the flat profile thickness 56 of the folded airbag 30 is less than half of at least one of the upright dimension 58 and the longitudinal dimension 64. In another embodiment, the longitudinal dimension 64 is at least three times the flat profile thickness 56 of the folded airbag 30. In at least one other embodiment, the longitudinal dimension 64 is greater than three times the flat profile thickness 56 of the folded airbag 30. As such, the airbag 30 provides protection for an occupant along the entire upright distance of the seatback 12.

The airbag module 16 can obtain a flat profile by folding the airbag 30 in flat pattern. The airbag 30 has a central fold 60 that extends in a fore-aft direction of the bolster cushion 22. The central fold 60 is defined by a pair of distal folds 62. The distal folds 62 are formed at a distal location away from the inflator 32 and are adjacent the front side 42 of the bolster. In at least one embodiment, the central fold 60 extends in the fore-aft direction substantially along the entire length of the bolster cushion 22. In another embodiment, the central fold 60 extends in the fore-aft direction substantially along the entire length of the seatback 12.

Figure 5:
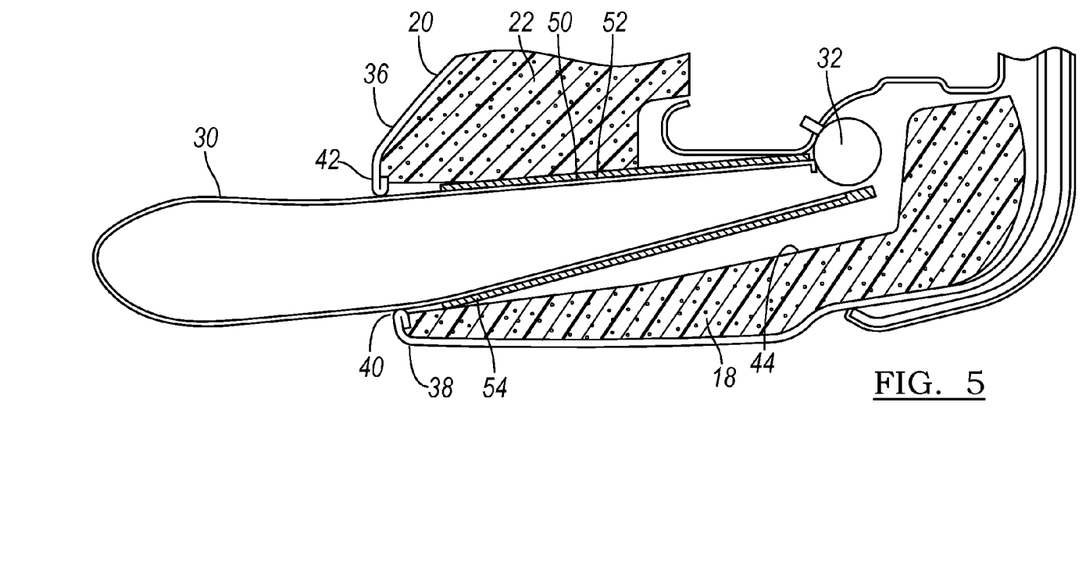
FIG. 5 is a cross-sectional view of the seat back cushion assembly of FIG. 3 showing the airbag partially inflated.

Referring to FIGS. 4-5, operation of the vehicle seat assembly 10 will now be described in detail. Upon a sufficient triggering event, such as impact to a vehicle in which the seat assembly 10 is mounted or other sufficient acceleration or deceleration event, for example, the airbag module 16 may be activated in any suitable manner to cause the airbag 30 to deploy. For example, a controller (not shown) may energize the inflator 32 upon receiving input from a sensor (not shown) that is indicative of a sufficient triggering event.

During deployment, the inflator 32 inflates the airbag 30, which causes the deployment location 40 to rupture, separate, or otherwise open, and further causes the inner and outer panels 52 and 54 of the airbag support structure 50 to pivot, flex or move apart, as shown in FIG. 5. As the airbag 30 continues to inflate, the inflating airbag 30 ruptures the deployment seam 40, the airbag 30 projects through the trim cover 20 to a deployed position. During inflation of the airbag 30, the central fold 60 is inverted and extends outside through the trim cover 20 and outboard of the seat pad 18.

FIGS. 6-9 show additional embodiments an airbag module 16 according to the present disclosure for use with a vehicle seat assembly 10. The airbag modules 16 in these embodiments may function in a similar manner as discussed above in detail.

As illustrated in FIGS. 6-9, the seat assembly 10 can include an airbag guide 70 associated with the airbag module 20. In at least one embodiment, the airbag guide 70 comprises an inner panel 72 and an outer panel 74. The airbag guide 70 is made of any suitable sheet material effective to protect the seat pad 18 during deployment of the airbag 30. For example, a woven or non-woven cloth material, which may include natural or synthetic materials such as nylon. One material that is found to be effective is a polyester material, of the type from which the airbag 30 may be manufactured. The sheet material may be flexible or elastic. Regardless of the type of material used to make the airbag guide 70, the use of the airbag guide 70 can be helpful in reducing friction on the airbag 30 as it deploys. Although a polymer such as nylon may be particularly beneficial, even a fleece material will help reduce the friction on the airbag 30. This is because the airbag guide 70 inhibits contact between the deploying airbag 30 and the seat pad 18 and helps to prevent foam fragmentation of the seat pad 18 and bolster cushion 22.

Figure 6:
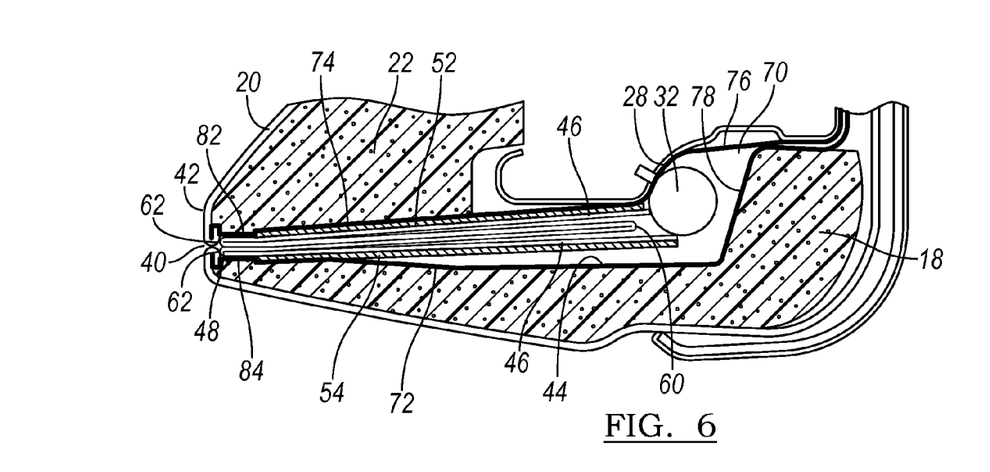
FIG. 6 is a cross-sectional view of the seat back cushion assembly of FIG. 3 showing the airbag more fully inflated.
Figure 7:
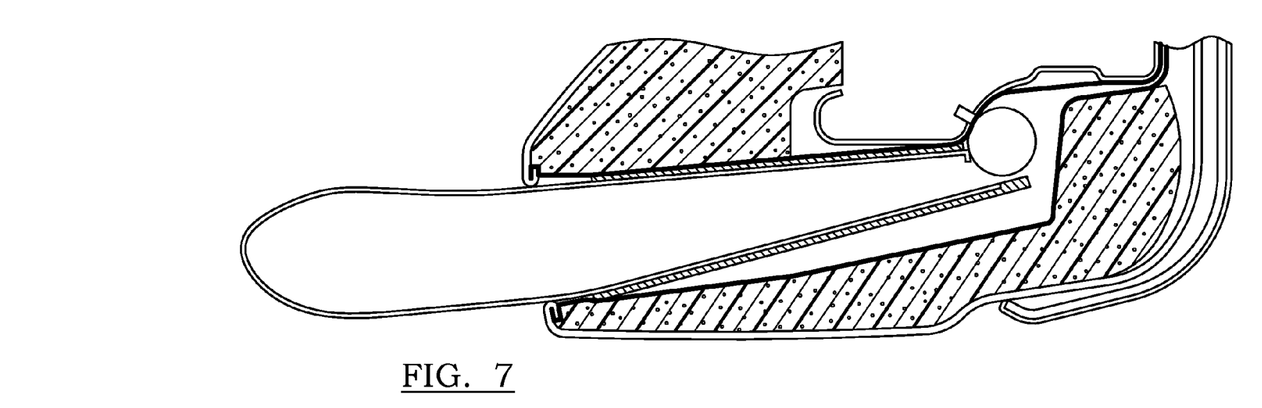
FIG. 7 is a cross-sectional view of a seat back cushion assembly including another embodiment of an airbag module according to the present disclosure.

In at least one embodiment show in FIGS. 6-7, the inner and outer panels 72, 74 of the airbag guide 70 respectively have rear ends 76, 78 that may attach to the frame 28 and/or inflator 32 to effectively associate the airbag guide 70 with the seatback assembly 12 and/or airbag module 16. The ends 76, 78 may be secured to the frame 28 and inflator 32 in any suitable manner, such as by ultrasonic welding, stitching or adhesive. In the embodiment shown in FIG. 6-7, the airbag guide 70 encloses the entire airbag module 16 including the inflator 32.

In the illustrated embodiments, the inner and outer panels 72, 74 of the airbag guide 70 respectively include front ends 82, 84 attached to the trim cover 20 adjacent the release seam 40. As illustrated in FIG. 6-9, the front ends 82, 84 of the panels 72, 74 are secured to opposite sides of the release seam 40, however it is contemplated that the ends 82, 84 could be secured on the same side of the release seam 40, i.e., on the same trim cover panel. The front ends 82, 84 of the inner and outer panels 72, 74 can be attached to the trim cover 20 adjacent the release seam 40 by any suitable manner, such as via stitching, ultrasonic welding, adhesive, etc.

In at least one embodiment, the airbag guide 70 is effective to inhibit contact between the deploying airbag 30 and the seat pad 18. This can help to prevent energy loss from the airbag 30 by decreasing friction and protecting the seat pad 18 from damage. This, in turn, can also help to reduce the deployment time for the airbag 30 and/or the amount of inflation fluid required to deploy the airbag.

Figure 8:
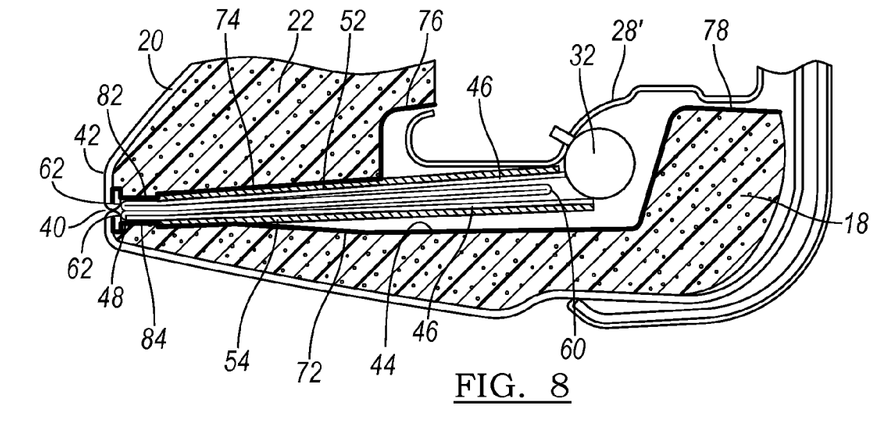
FIG. 8 is a cross-sectional view of the seat back cushion assembly of FIG. 6, showing an airbag of the airbag module partially inflated.
Figure 9:
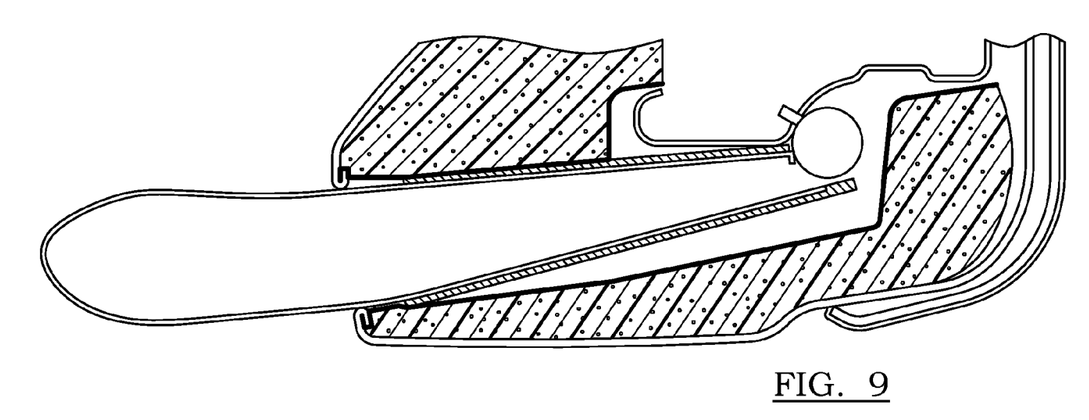
FIG. 9 is a cross-sectional view of another seat back cushion assembly including yet another embodiment of an airbag module according to the present disclosure.

In the embodiment shown in FIG. 8-9, the airbag guide 70, the rear end 76 follows the contour of the seat pad 18 and the channel 44 and does not encloses the entire airbag module 16 and the inflator 32. Further, in this embodiment, the inner and outer panels 72, 74 of the airbag guide 70 may be laminated fleece shields. The fleece shields may be integrally molded or formed with the seat pad 18. Alternatively, the fleece shields may be attached to the seat pad 18 with adhesive or any other suitable technique.

Figure 10:
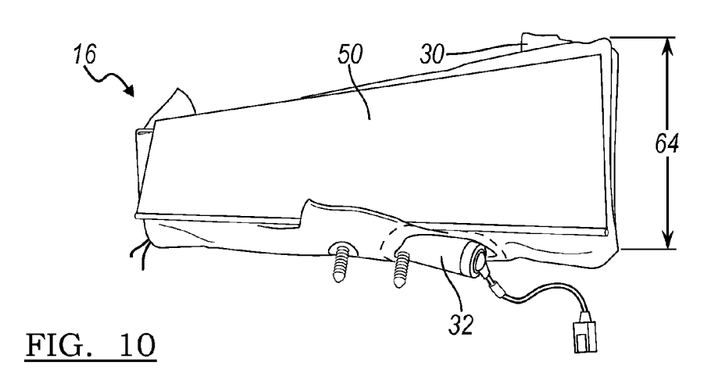
FIG. 10 is a side perspective view of an airbag module according the present disclosure.
Figure 11:
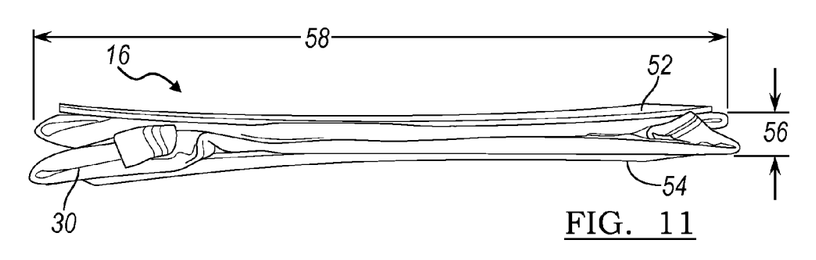
FIG. 11 is a front perspective view of the airbag module of FIG. 10.
Figure 12:
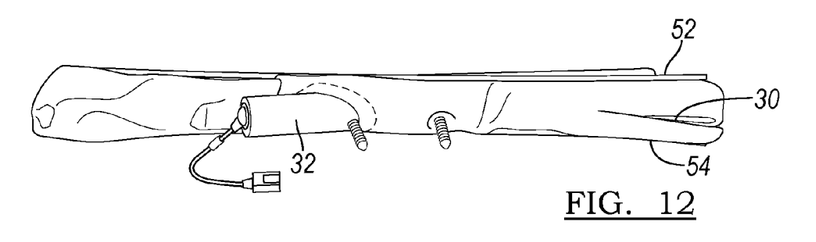
FIG. 12 is a rear perspective view of a airbag module of FIG. 10.
Figure 13:
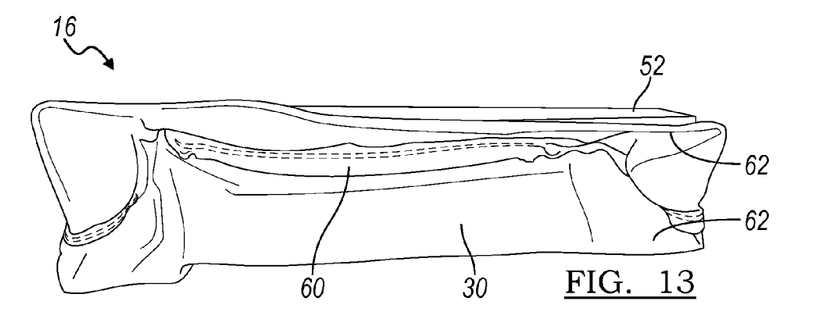
FIG. 13 is a another front perspective view of the airbag module of FIG. 10.

Other details, designs, variants, aspects, and embodiments are shown in the perspective views of the airbag module and seatback shown in FIGS. 10-15. FIG. 10 is a side perspective view of an airbag module 16 showing the airbag 30 and inflator 32 as well as the support structure 50. FIG. 11 is a front perspective view of the airbag module 16 having a flat profile 56. FIG. 12 is a rear perspective view of the airbag module 16. FIG. 13 is another front perspective view of the airbag 16 held open so that the central fold 60 and distal folds 62 can be easily shown.

Figure 14:
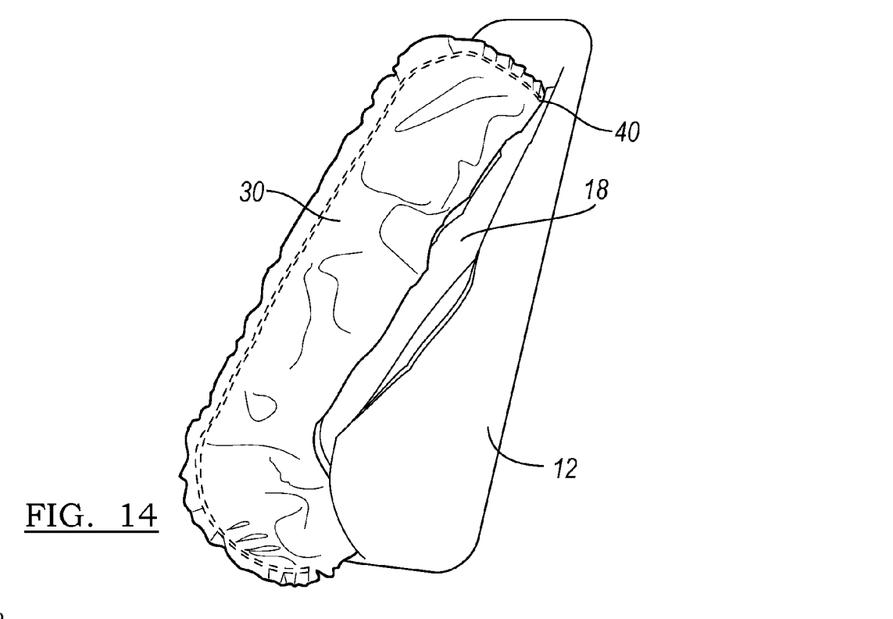
FIG. 14 is a side perspective view of the a seatback including an airbag module according to the present disclosure wherein the airbag is shown in a deployed position.
Figure 15:
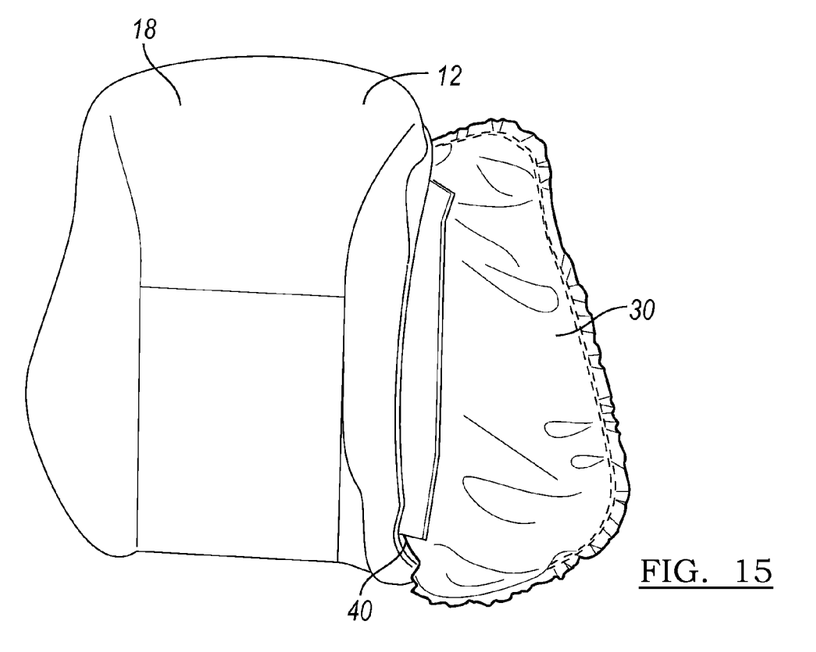
FIG. 15 is a front perspective view of the seatback and the airbag module of FIG. 14.

FIG. 14 is a side perspective view of the seatback 12 including an airbag module 16 wherein the airbag 30 is shown in a deployed position. In the deployed position, the seam 40 has ruptured and the airbag 30 extends outboard from the seat pad 18. FIG. 15 is a front perspective view of the seatback 12 and the airbag module 16 where the airbag 30 is shown in the deployed position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, any of the above airbag module embodiments may be used with any suitable vehicle seat configuration, such as any of the above described seat assemblies. As another example, any of the extensions of the above described airbag module embodiments may extend between the associated airbag and any other seat component, or multiple components, to protect the air bag and/or seat component(s) during airbag deployment.

We claim an airbag module comprising any combination of features shown in the figures and/or described in the application.

What is claimed is:

1. A vehicle seat assembly comprising:
a frame;
a seat pad adjacent the frame; and
a trim cover extending over the seat pad and including a release seam, the release seam having:
an airbag assembly mounted on the frame within the trim cover, the airbag assembly including an inflator and a folded airbag that is inflated by the inflator to unfold and project in a longitudinal direction from the seat through the release seam of the trim cover, wherein the folded airbag has a single central fold extending in the longitudinal direction defined between a pair of distal folds disposed adjacent the release seam so as to be oriented toward the release seam, wherein the airbag does not include any folds other than the single central fold and the pair of distal folds that define the single central fold.

2. The seat assembly of claim 1 wherein the single central fold has a longitudinal dimension that extends in the longitudinal direction and is greater than a thickness of the folded airbag in a lateral direction being transverse to the longitudinal direction for increased compactness in the lateral direction.

3. The seat assembly of claim 1 further comprising an airbag guide disposed between the seat pad and the airbag assembly, the airbag guide including an inner panel, an outer panel, wherein the airbag assembly is disposed between the inner panel and the outer panel.

4. The seat assembly of claim 3 wherein the inner and outer panels of the airbag guide extend along at least a portion of the seat pad and extend to the trim cover adjacent the release seam.

5. The seat assembly of claim 1 wherein the folded airbag further comprises a pair of elongated end segments, wherein each of the elongated segments extend from the inflator to one of the pair of distal folds, wherein a pair of support panels is disposed adjacent the elongated end segments, respectively, for providing support to the airbag assembly.

6. The seat assembly of claim 1 wherein the seat pad comprises a bolster cushion disposed along a lateral side of the seat assembly.

7. The seat assembly of claim 1 wherein a total thickness of the folded airbag is defined between the pair of distal folds, wherein the single central fold has a longitudinal dimension that extends in the longitudinal direction and is greater than the thickness of the folded airbag in a lateral direction being transverse to the longitudinal direction, thereby defining a flat lateral profile for increased compactness in the lateral direction.

8. The seat assembly of claim 1 wherein the airbag has an upright length in an upright direction being transverse to the longitudinal and lateral directions, wherein the total thickness of the folded airbag is less than one-eighth of the upright length.

9. An airbag assembly comprising:
an inflator adapted for being mounted to a vehicle frame; and
a folded airbag that is inflated by the inflator to unfold in a longitudinal direction and project the unfolded airbag in the longitudinal direction, wherein the folded airbag has a single central fold extending in the longitudinal direction between a pair of distal folds disposed opposite the inflator and defining distal ends of the single central fold,
wherein a total thickness of the folded airbag is defined between the pair of distal folds,
wherein the single central fold has a longitudinal dimension that extends in the longitudinal direction and is greater than the thickness of the folded airbag in a lateral direction being transverse to the longitudinal direction, thereby defining a flat lateral profile for increased compactness in the lateral direction.

10. The airbag assembly of claim 9 wherein the thickness of the folded airbag is less than half of the longitudinal dimension.

11. The airbag assembly of claim 9 wherein the airbag has an upright length in an upright direction being transverse to the longitudinal and lateral directions, wherein the total thickness of the folded airbag is less than one-eighth of the upright length.

12. The airbag assembly of claim 9 wherein the folded airbag includes a pair of elongated end segments wherein in at least one of the elongated end segments defines the longitudinal dimension, wherein each of the elongated end segments extend from the inflator to one of the pair of distal folds.

13. The airbag assembly of claim 9 wherein the airbag does not include any folds other than the single central fold and the pair of distal folds that define the single central fold.

14. A vehicle seat assembly comprising:
a frame;
an inflator adapted for being mounted to a vehicle frame; and
a folded airbag that is inflated by the inflator to unfold in a longitudinal direction and project in the longitudinal direction, wherein the folded airbag has a single central fold extending in the longitudinal direction and a pair of distal folds disposed opposite the inflator and defining a distal end of the single central fold,
wherein a total thickness of the folded airbag is defined between the pair of distal folds,
wherein the single central fold has a longitudinal dimension that extends in the longitudinal direction and is greater than the thickness of the folded airbag in a lateral direction being transverse to the longitudinal direction, thereby defining a flat lateral profile for increased compactness in the lateral direction.

15. The vehicle seat assembly of claim 14 further comprising a trim cover including a release seam, wherein the distal folds are formed adjacent to and oriented toward the release seam, the airbag thereby projection through the release seam upon inflation.

16. The vehicle seat assembly of claim 14 wherein the folded airbag includes a pair of elongated end segments, wherein each of the elongated end segments extend from the inflator to one of the pair of distal folds, wherein a pair of support panels is disposed adjacent the elongated end segments, respectively, for providing support to the folded airbag.

17. The vehicle seat assembly of claim 14 further comprising a bolster cushion disposed along a lateral side of a vehicle seat assembly, a trim cover extending over the bolster cushion.

18. The vehicle seat assembly of claim 14 wherein the airbag does not include any folds other than the single central fold and the pair of distal folds that define the single central fold.

19. The vehicle seat assembly of claim 14 wherein the thickness of the folded airbag is less than half of the longitudinal dimension.

20. The vehicle seat assembly of claim 14 wherein the airbag has an upright length in an upright direction being transverse to the longitudinal and lateral directions, wherein the total thickness of the folded airbag is less than one-eighth of the upright length.

* * * * *